May 16, 1967  J. P. GOODMAN  3,320,000
LOAD DISCHARGING DEVICE
Filed June 14, 1965  3 Sheets-Sheet 1
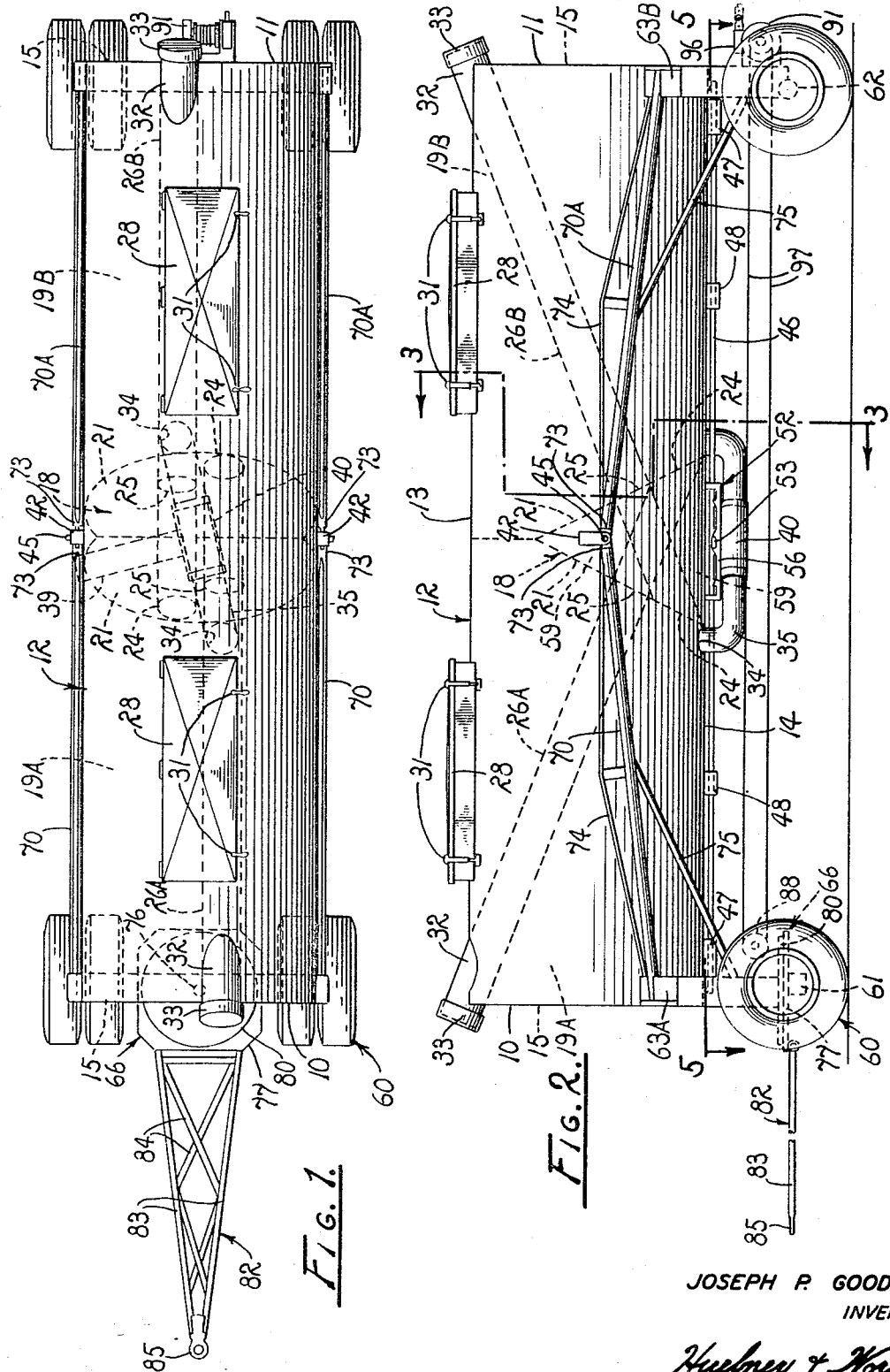
JOSEPH P. GOODMAN
INVENTOR
Huebner & Worrel
ATTORNEYS

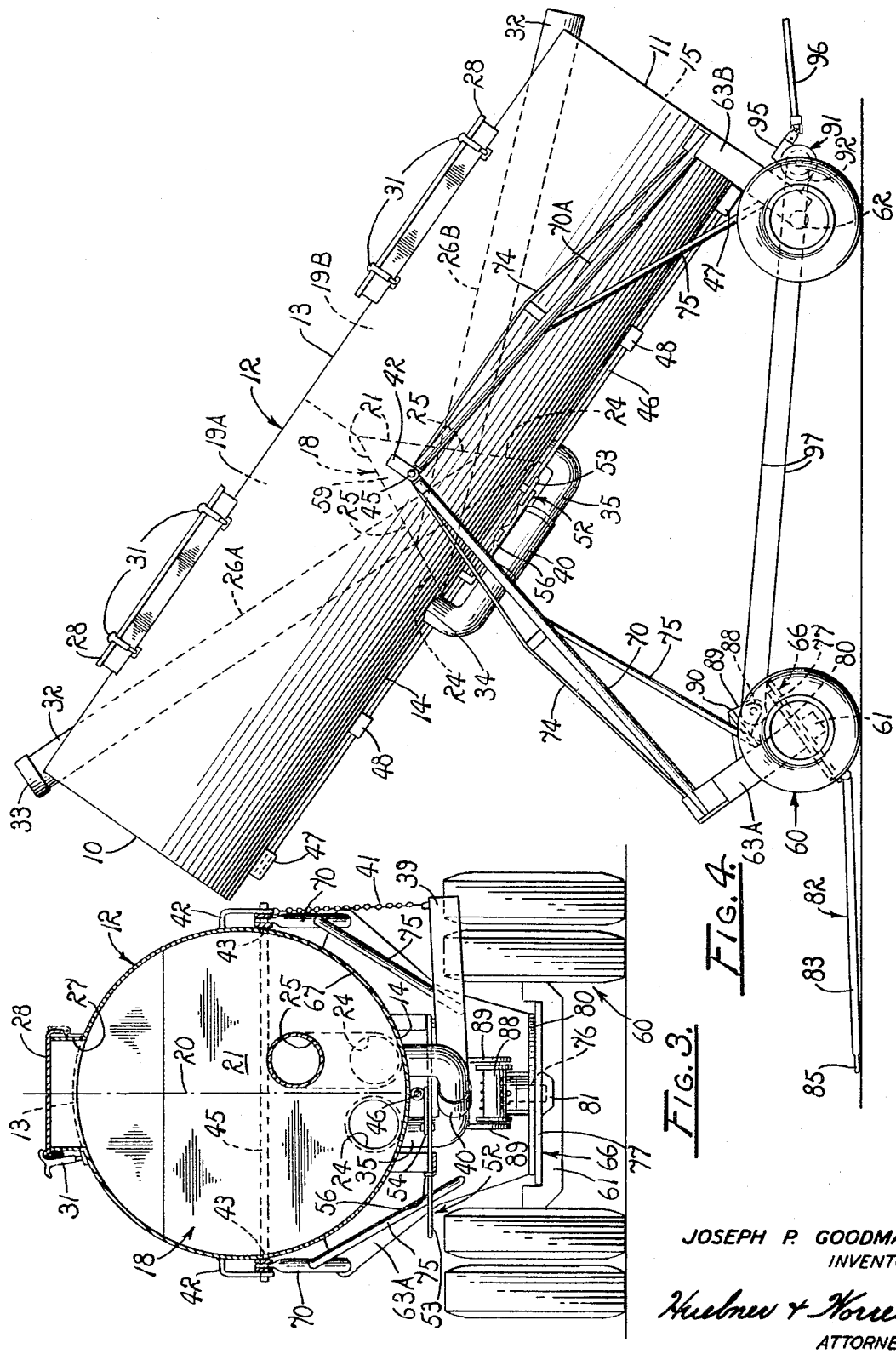

JOSEPH P. GOODMAN
INVENTOR

Huebner & Worrel
ATTORNEYS

United States Patent Office 3,320,000
Patented May 16, 1967

3,320,000
LOAD DISCHARGING DEVICE
Joseph P. Goodman, 105 Beardsley Ave.,
Bakersfield, Calif. 93308
Filed June 14, 1965, Ser. No. 463,844
8 Claims. (Cl. 298—7)

The present invention relates to a load discharging device and more particularly to such a device which is adapted vehicularly to transport flowable material and which is operable gravitationally to discharge said material at an elevation above that which it occupies during transport.

Although the device of the present invention is described in connection with the handling of a dry, flowable material, it will be apparent that the device is also adapted to use in the handling of liquids.

In the handling of various types of dry, flowable material it is frequently desirable to transfer quantities of material from a central supply source to various types of vehicles for distribution in the field, to transport loads of material from one station to another, and quickly and conveniently to load and to unload quantities of material. Although such operations are generally typical of material handling, such as the handling and processing of salt, flour and the like, or the distribution of sand on icy roads, they are particularly advantageous in the agricultural utilization of soil amendments and fertilizers, such as pulverulent ammonium sulfate.

In the application of ammonium sulfate and other pulverulent soil amendments or fertilizers to fields under cultivation, it has been the practice to transport such materials in large trucks and trailers to the fields. There the materials are deposited in mobile spreaders for field distribution. The spreaders normally consist of vehicles, which are either self-propelled or tractor drawn, employ one or more spreader plates rotated about substantially erect axes, and onto which the material is discharged at a regular flow rate from a hopper or other elevated magazine for such material on the vehicle. The spreader plates are transported at an elevated position so as to provide a trajectory of material discharge achieving an acceptable range. Since the spreaders must be maneuverable, the spreader plates elevated, and the hoppers or magazines elevated above the spreader plates for discharge thereon, it has not been practical to suit the spreaders to highway travel nor to provide them with sufficient capacity for economical transport of such materials from their source to the fields of application. It has thus been the practice to supply the spreaders by means of large capacity trucks and trailers which transport the materials from their source to the fields. Such trucks and trailers do not provide sufficiently elevated points of discharge to permit the transport of the materials in bulk and their discharge at a height sufficient to reach the hoppers or magazines of the spreaders. It has, therefore, previously been necessary to haul the materials in bags of a size which can be manually loaded, unloaded, and deposited in the elevated hoppers or magazines of the spreaders, thus causing undesirable delay and increased expense.

Therefore, it is an object of the present invention to provide an improved load discharging device.

Another object is to provide such a device which is adapted vehicularly to transport flowable material and which is operable gravitationally to discharge said material at an elevation above that which it occupies during transport.

Another object is to provide such a load discharging device which is adapted to transport flowable material in a protectively covered, dry condition.

Another object is to provide such a device which is adapted to contain separately two quantities of material for either transport or storage.

Another object is to provide such a device adapted to allow selective discharge of said separate quantities of material.

Another object is to provide such a device which allows quantitative and directional control of a mass of material being discharged so that the material can be unloaded onto the elevated hopper of a spreader vehicle.

Another object is to provide such a device which eliminates the need for time-consuming loading and unloading of individual bags.

Another object is to provide such a device which allows the convenient and economical handling of quantities of material with a minimum of equipment.

Another object is to provide such a device which minimizes personnel requirements in the distribution of quantities of flowable materials.

Another object is to provide such a device which is adapted to travel on the highway at maximum legal speeds and with maximum safety.

These, together with other objects, will become more fully apparent upon reference to the description in the specification and the accompanying drawings.

In the drawings:

FIG. 1 is a plan view of a load transport vehicle embodying the principles of the present invention.

FIG. 2 is a side elevation of the vehicle of FIG. 1.

FIG. 3 is an enlarged transverse section of the vehicle of FIG. 2 taken in a plane of projection represented by line 3—3 in FIG. 2.

FIG. 4 is a side elevation of the vehicle of FIG. 1 showing the tank tilted for discharge of a load.

Figure 5:
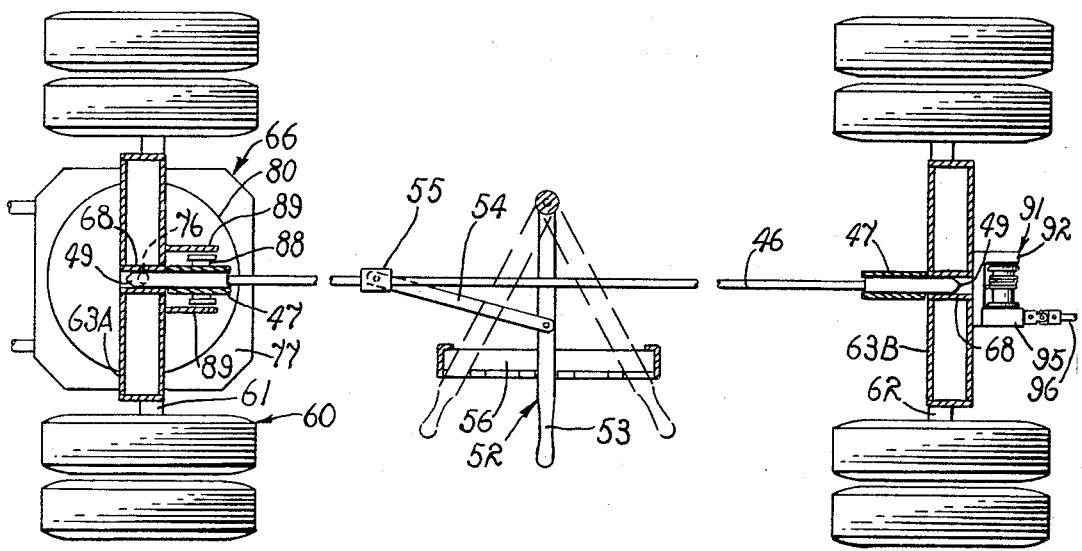
FIG. 5 is an enlarged fragmentary horizontal section of the vehicle of FIG. 2 taken in a plane represented by line 5—5 thereof.
Figure 6:
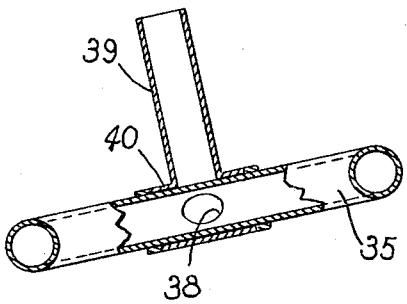
FIG. 6 is a further enlarged fragmentary section of the auxiliary duct.

Referring more particularly to the drawings, an elongated container or tank having front and rear ends 10 and 11, respectively, is shown generally at 12. The tank has a top 13, bottom 14 and end walls 15. A trifoliated center partition 18 is mounted inside the tank and divides the tank into two separate compartments 19A and 19B. The center line 20 of the partition is disposed substantially perpendicularly of the bottom and the longitudinal axis of the tank. The partition has two leaves 21 extending to the bottom of the tank. Each leaf has an opening 24 adjacent to the bottom of the tank and a second opening 25 disposed above the opening 24 and on the opposite side of the partition center line therefrom. The openings are adapted respectively to accommodate elongated ducts 26A and 26B, to be described. The tank is provided with access openings or manholes 27 disposed above the respective compartments. Each manhole has a hinged cover 28 with suitable latches 31.

A duct 26 extends through each compartment 19 and the corresponding opening 25. Each duct is preferably substantially cylindrical and has one end connected in a suitable manner, such as by welding, in the opening 24 leading from the other compartment. The second or discharge end 32 of each duct extends through the top and end wall of the tank 12 so that the ducts are disposed preferably in symmetrical relation to each other relative to the partition center line 20. The discharge end of each duct is disposed at a height above the ground such that when the tank is tilted on its corresponding end, as will be described, the end of the duct is at a selected elevation above the hopper or magazine of a spreader vehicle, not shown, to allow free discharge of fertilizer into the hopper. Each duct provides a continuous passageway leading from its compartment and extending outwardly of the tank. The ducts are provided with suitable removable covers 33.

The bottom of each compartment 19 has an opening 34 in which is connected an auxiliary duct 35 having a discharge opening 38. A discharge duct 39 is mounted on the auxiliary duct by means of a perforated valve sleeve 40 mounted in sleeved engagement with the auxiliary duct and adapted to be rotated for selective alignment of the discharge duct with the discharge opening. A suitable rope or chain 41 holds the discharge duct in place during travel of the device. Additional valves, not shown, may be provided in the auxiliary duct, if necessary, to supplement control of the material to be discharged through the auxiliary duct.

A perforated ear 42 is mounted on each side of the tank 12. The ears are aligned with holes 43 extending respectively through each side of the tank and are adapted to accommodate an elongated pivot rod 45 which extends through the tank between the lower leaves 21 of the partition.

A detent or latch rod 46 is mounted beneath the tank 12 by means of guide tubes 47 preferably welded to the bottom 14 of the tank, one guide tube being situated at each end of the tank. In addition, the rod is preferably supported by intermediate alignment tubes 48. The rod has enlarged ends each providing a detent nose 49. A latch lever assembly 52 is mounted midway of the tank and consists of a hand lever 53 pivotally connected to the tank in any suitable manner. The hand lever is in turn pivotally connected through a linking lever 54 to a sleeve 55 rigidly secured to the rod. By manipulating the hand lever, the rod may be reciprocated in either direction longitudinally of the tank in order to engage or disengage the respective detent noses, as desired. A ratch bracket 56 is secured, preferably by welding or the like, to the bottom of the tank and is adapted to secure the hand lever in respective positions in which each of the respective detent noses projects from its corresponding guide tube and in which either one or the other is retracted within its guide tube. Although the partition 18 may consist of a single wall member, if desired, the described trifoliated partition is preferable, due to its forming an intermediate dead space 59 for accommodating the pivot rod 45 and to avoid obstruction of the lever assembly by the auxiliary duct 35.

At each end of the tank 12 is a vehicular or support wheel assembly 60, preferably of a typical double-wheel structure to allow support of heavy loads. The wheels at the front end 10 of the tank are mounted on individual axles, not shown, which are housed within a typical offset axle housing 61. The wheels at the rear end 11 are mounted on a single axle, not shown, which is housed in a typical straight axle housing 62.

A saddle 63 is disposed between each pair of wheels. The saddle 63A at the front end 10 of the tank 12 is mounted on a typical fifth-wheel assembly 66, to be described. The saddle 63B at the rear end 11 of the tank is rigidly secured to the axle housing 62 by means of bolts, welding or the like. Each saddle has an arcuate portion 67 adapted to seat the tank and is otherwise suitably shaped to allow adequate space for the various structural elements of the present device, to be described. Suitable cushioning material, not shown, may be secured to the arcuate portions to prevent undesirable abrasion or noisy contact between the tank and the saddle. A locking tube 68 for each detent nose 49 is mounted at the center of the corresponding saddle, preferably by welding.

To each side of the respective saddle 63, one end 69 of an elongated support member or leg 70 is secured, by welding or the like. The support members on each side of the tank 12 are joined hingedly or pivotally at their second ends 73 in a retractable A-frame arrangement having its apex at the junction of said second ends. One support member 70A of each such A-frame has a clevis-shaped end adapted to allow mated frictionless engagement of the two ends 73 on the pivot rod 45, as shown in FIG. 3. Each support member is preferably stiffened by longitudinal brace struts 74. Additional brace struts 75 may be provided diagonally of the tank, one end of each being secured to a support member and the opposite end, not shown, being secured either to the corresponding axle housing or to the saddle.

A typical fifth-wheel assembly 66 is connected in a suitable manner to the support wheel assembly 60 at the front end 10 of the tank 12. It includes a king pin 76 and a pivotal member or turntable 77 secured to the axle housing 61. The pivotal member is sandwiched between a bearing plate 80 secured to the saddle 63A by welding or the like and a plate 81 welded to the bottom of the king pin to allow free pivotal movement of the pivotal member and wheel assembly about the king pin. A elongated drawbar member 82 extends from the pivotal member 77 and consists of a pair of drawbars 83 connected by diagonal struts 84 and having a common perforated end 85 for attachment to a prime mover, not shown.

A pulley 88 is mounted on the front wheel assembly 60, preferably by means of support brackets 89 welded to a plate 90 secured to the saddle 63A. A suitable winch 91 is mounted on support brackets 92 secured to the rear saddle 63B. A detent device, not shown, is preferably provided for locking the winch. A typical power take-off mechanism 95 is provided for operating the winch and is connected through a universal-type power take-off linkage 96 to a source of power, not shown. In the present embodiment, the winch should be capable of effecting a line pull of approximately two thousand (2,000) pounds. The winch is preferably also adapted to be operated by means of a hand crank, not shown. An elongated cable 97 is wound around the pully and the winch in a quadruple tackle arrangement. One end of the cable, not shown, is attached to the winch shaft and its other end, not shown, is anchored to the wheel assembly, or saddle, adjacent to the winch. The positions of the winch and pulley on the respective wheel assemblies may be reversed, if desired.

*Operation*

The operation of the described embodiment is believed to be readily apparent and is briefly summarized at this point. Initially, either or both compartments 19 of the tank 12 are filled with pulverulent ammonium sulfate or other flowable material. This may be conveniently accomplished with the tank in a horizontal position by pouring the material through the manholes 27 until the respective compartments are filled to the desired level. The vehicle is then towed to the field, where it is positioned adjacent to the spreader vehicle, not shown, with the tank still disposed in a horizontal position and both noses 49 of the detent rod 46 engaged. The tank serves as the vehicular frame when in this position due to its rigid connection and firm support on the saddles 63 of both wheel assemblies 60. The detent rod holds the ends of the tank in secure engagement on the wheel assemblies so that the device may be towed on the highway at maximum legal speeds and with maximum safety.

The lever 53 is then manipulated to disconnect the detent nose 49 at the end of the tank 12 which is to be elevated. The nature of the over-all detent structure is such that only one nose may be disconnected at a time, thus preventing possible inadvertent separation of the tank from both of its support-wheel assemblies 60. The winch 91 is then activated by means of the power take-off 95 or a hand crank so as to draw the wheel assemblies towards one another. This forces the support members 70 and 70A to buckle upwardly on both sides of the tank and to elevate their respective apexes 73 as well as the unlatched end of the tank, as best shown in FIG. 4. During this operation, the discharge end 32 of the duct 26B at the end of the tank which is latched down remains at substantially the same elevation, an elevation, for example, adequate to discharge into the hopper of a spreader vehicle, while the inner end is elevated sufficiently to permit gravitational flow of material from the elevated compartment 19A through the duct 26B for discharge.

For example, after the tank 12 has been elevated to a position in which the discharge end 32 of the duct 26B leading from the elevated compartment 19A is below the inner end thereof, as shown in FIG. 4, the power take-off 95 is shut off and the winch 91 is locked. The tank may be raised to an even higher elevation than that shown in FIG. 4, if desired. The duct covers 33 are next removed and the tank is ready for gravitational unloading of the elevated compartment 19A.

In unloading a quantity of dry, flowable material such as ammonium sulfate onto a spreader vehicle, the material discharges gravitationally from the elevated compartment through the duct 26B and is deposited in the hopper of the vehicle in a relatively confined stream.

During transport, the material is kept dry by the protective covering afforded by the tank 12 and tends to flow freely, thus allowing the emptying of the compartment 19A completely, if desired, and in a minimum of time.

For unloading in areas having space limitations which prevent the disposition of a spreader vehicle at the end of the tank 12, the auxiliary unloading duct 35 may be utilized. By rotating the sleeve 40 the duct 39 is aligned with the discharge opening 38, thereby allowing gravitational discharge of the flowable material. By elevating one end of the tank, the material is caused to flow only from the elevated compartment, thus allowing selective emptying of the two compartments 19.

To empty the compartment 19B, the winch is released and the support members 70 and 70A are permitted gravitationally to return to substantially horizontal positions. The forward end of the tank 10 is then latched down, the rearward end 11 released, and the A-frame correspondingly buckled upwardly to elevate the compartment 19B for gravitational discharge of its contents through the duct 26A.

After completion of the unloading process, the winch 91 is released to extend the assemblies 60 to their original positions and thereby to lower the tank 12 into its traveling position on the saddles 63. The lever 53 is manipulated to connect the detent rod 46 at both ends of the tank. The device may then be towed to another position for subsequent loading and/or unloading, or for transport on the highway, as desired.

Whereas, previous to this invention, several workmen have taken more than forty-five (45) minutes to unload from trucks approximately twenty-two (22) tons of ammonium sulfate in bags and to transfer the same to a vehicular spreader in the field, the same job can now be accomplished in only a few minutes by using the device of the present invention, with only one operator. Consequently, the cost of the loading operation is substantially reduced. Similarly, the efficiency of unloading is greatly increased.

From the foregoing, it is readily apparent that a load discharging device has been provided which is adapted vehicularly to transport flowable material and which is operable gravitationally to discharge flowable material at an elevation above that which it occupies during transport. The device is adapted to contain separately two quantities of material for either storage or transport on the highway, and to unload said two quantities separately. The device discharges the material being unloaded in a confined stream which allows quantitative and directional control of the mass of material being unloaded. By use of this invention, it is possible to load and to unload quantities of material more conveniently, economically and efficiently than heretofore.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A load discharging device comprising an elongated container having longitudinally opposite end portions, said portions each providing a separate compartment having a bottom and adapted to contain a quantity of material; an elongated duct for each compartment, said ducts being mounted in the container and each having a first end connected to its corresponding compartment adjacently of the bottom thereof and in materials communication therewith, each said duct extending from an end portion of one compartment through the other said compartment with a second end disposed at the opposite end of the container from its corresponding compartment and above said container; means supporting the container in substantially horizontal relationship with the respective second ends of the ducts disposed at a higher elevation than the first ends; and mean operably associated with the container for selectively elevating either end portion of the container and its compartment above the other end portion, the first end of the duct connected to the elevated compartment being thereby disposed above the second end of said duct, said duct when so disposed being adapted gravitationally to discharge material from said elevated compartment.

2. In a load receiving and discharging member, the combination of:
  (I) an elongated container having
    (A) opposite ends,
    (B) a bottom,
    (C) a top, and
    (D) a transverse wall dividing the container into first and second compartments;
  (II) a first duct connected to the first compartment adjacent to the bottom of the container and extended through the second compartment and out the end of the container adjacent to the second compartment at the top thereof;
  (III) a second duct connected to the second compartment adjacent to the bottom of the container and extended through the first compartment and out the end of the container adjacent to the first compartment at the top thereof; and
  (IV) means pivotally supporting the container for elevational movement about a fulcrum transversely of the container adjacent to the transverse wall whereby the container can be tipped in one direction to raise the first compartment so that the end of the first duct connected thereto is higher than the extended end thereof for gravitational discharge of contents of the first compartment therethrough and the container can be alternately tipped in the opposite direction to raise the second compartment so that the end of the second duct connected thereto is higher than the extended end thereof for gravitational discharge of contents of the second compartment therethrough.

3. A load transporting vehicle comprising:
  (I) a pair of spaced wheel assemblies;
  (II) a frame having opposite ends mounted on the wheel assemblies,
    (A) said frame being divided intermediate the wheel assemblies into first and second aligned end portions and having
    (B) means pivotally interconnecting said first and second end portions for upward buckling movement;
  (III) an elongated container having
    (A) a first end disposed over the first end portion of the frame,
    (B) a second end disposed over the second end portion of the frame,
    (C) a bottom, (D) a top, and (E) a transverse wall dividing the container into first and second compartments corresponding to said ends thereof;

(IV) a first duct connected to the first compartment adjacent to the bottom of the container and extended out the second end of the container adjacent to the top thereof;

(V) a second duct connected to the second compartment adjacent to the bottom of the container and extended out the first end of the container adjacent to the top thereof;

(VI) means pivotally mounting the container for elevational movement about a fulcrum adjacent to the pivotal interconnection of the end portions of the frame whereby the container can be tipped in one direction to raise the first compartment so that the end of the first duct connected thereto is higher than the extended end thereof for gravitational discharge of contents of the first compartment therethrough and the container can be alternately tipped in the opposite direction to raise the second compartment so that the end of the second duct connected thereto is higher than the extended end thereof for gravitational discharge of contents of the second compartment therethrough; and (VII) power actuated means interconnecting the wheel assemblies in controlled adjustably spaced relation whereby the frame can be upwardly buckled to raise the container by drawing the wheel assemblies toward each other and relatively flattened to lower the container by separation of the wheel assemblies.

4. The vehicle of claim 3 wherein the container has opposite sides and the frame comprises a pair of A-frames, one on each side of the container, said A-frames each including a pair of elongated legs having first and second opposite ends respectively, said first ends being pivotally connected together and to the corresponding side of the container, said second ends being connected respectively to the wheel assemblies alongside the container, said A-frames being adapted to upward buckling movement for raising the container.

5. The vehicle of claim 3 including an elongated rod mounted on the bottom of the container for reciprocal movement longitudinally of the container; a latch element mounted on each end of said rod; a detent mounted on each wheel assembly, said detents being aligned with the rod and with said latch elements and being adapted respectively to engage the latch elements; and lever means operably associated with the rod and the bottom of the container for selectively reciprocating the rod between respective positions in which both latch elements are engaged by the respective detents, in which only one latch element is so engaged and in which only the other latch element is so engaged, for said respective positions of the rod the container having respectively both ends latched for transport, one end free for elevational movement and the other end free for elevational movement.

6. A load transporting vehicle comprising an elongated container having a longitudinal axis, a bottom and first and second longitudinally opposite end portions; partitioning means mounted within the container intermediate said portions and partitioning said container into respective first and second separate compartments each having a bottom and being adapted to contain a quantity of material, said partitioning means having a center line disposed substantially perpendicularly of the longitudinal axis of the container and of the bottom thereof; an elongated first duct mounted in the container and having a first end connected to the partitioning means in materials communication with the first compartment adjacently of the bottom thereof, said duct extending through the second compartment and the second end portion of the container, said duct having a second end disposed outwardly of the container; a second duct mounted in the container in substantially symmetrical relation to the first duct relative to the center line of the partitioning means, said second duct providing a materials passageway leading from the second compartment and extending out the first end portion of the container; first and second vehicular members each having a rotatable ground-engaging wheel; means releasably connecting the first and second end portions of the container to the first and second vehicular members respectively, said container when so connected being supported in substantially horizontal orientation and the second ends of the respective ducts being disposed at a higher elevation than the respective first ends thereof; means operably associated with the container and said connecting means for selectively alternatively disconnecting the respective end portions from their respective vehicular members; and support means connected between the vehicular members and the container for supporting a disconnected end portion and the corresponding compartment at an elevation higher than that of the other compartment, the duct of said elevated compartment thereby having its second end disposed at a lower elevation than its first end effectively to allow free gravitational passage of material from said elevated compartment and through said second end, said first and second vehicular members and said support means being operably associated so as to allow vehicular movement of said container.

7. The vehicle of claim 6 wherein the container has opposite sides, and the support means includes a pair of A-frames, one on each side of the container, said A-frames each having a hinged apex pivotally connected to the corresponding side of the container and a pair of elongated legs connected to the respective vehicular members alongside of the container.

8. The vehicle of claim 7 wherein the support means includes means for elevating a disconnected end portion, said elevating means comprising a pulley mounted on the vehicular member opposite from the disconnected end portion, a winch mounted on the other vehicular member, an elongated cable operably associated with said pulley and winch and adapted to cooperate therewith to draw the vehicular members towards one another, said A-frames thereby being retracted to elevate said apexes and to tilt the container.

References Cited by the Examiner

UNITED STATES PATENTS

| | | | |
|---|---|---|---|
| 10,752 | 4/1854 | MacGregor | 222—129 |
| 927,813 | 7/1909 | Rodenhausen | 298—7 |
| 2,453,499 | 11/1948 | Cunningham | 298—17.6 X |
| 2,857,669 | 10/1958 | Hain. | |
| 2,992,856 | 7/1961 | Schonrock | 298—20 |
| 3,193,150 | 7/1965 | Simas. | |

BENJAMIN HERSH, *Primary Examiner.*

RICHARD J. JOHNSON, *Examiner.*